Figure 1:
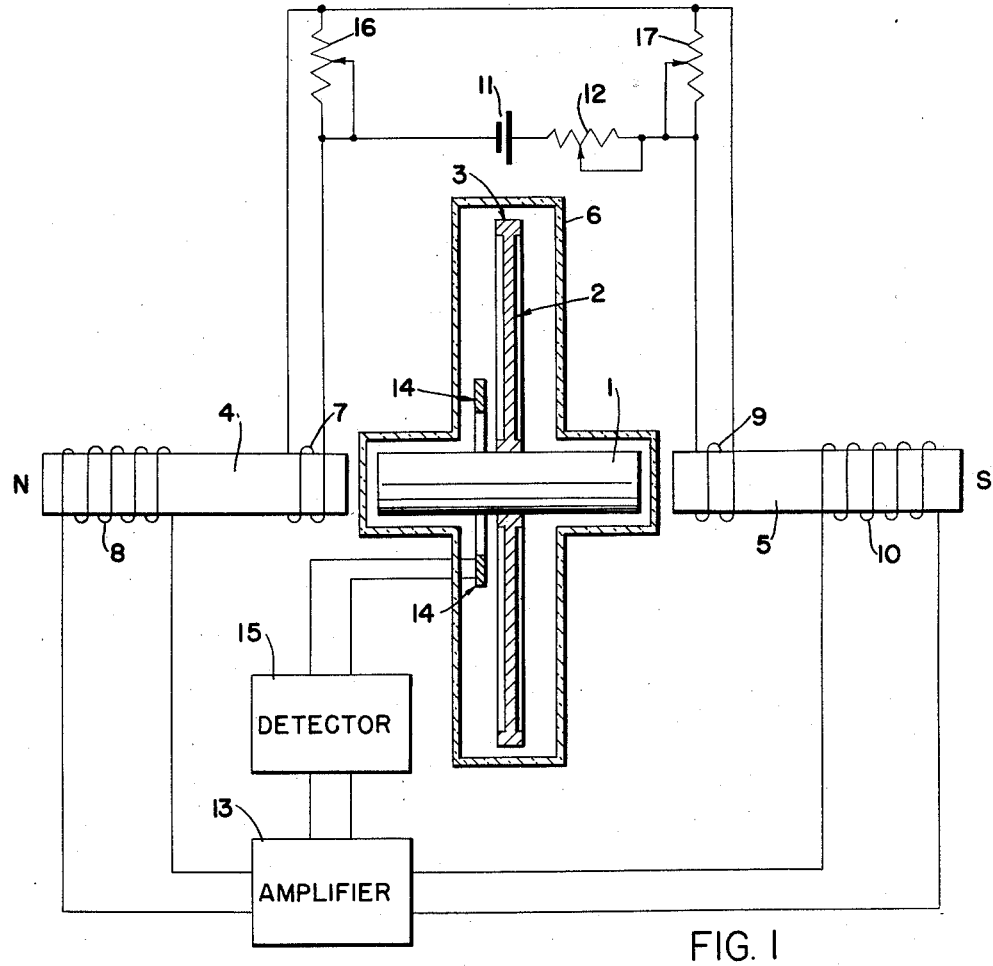

Oct. 14, 1958

E. N. DACUS 2,856,238

METHOD AND MEANS FOR SUSPENSION OF
A ROTATABLE OBJECT IN SPACE

Filed May 12, 1955

INVENTOR.
EDWARD N. DACUS
BY

Frank H. Harmon

ATTORNEY

United States Patent Office 2,856,238
Patented Oct. 14, 1958

2,856,238

METHOD AND MEANS FOR SUSPENSION OF A ROTATABLE OBJECT IN SPACE

Edward N. Dacus, San Diego County, Calif., assignor to Bill Jack Scientific Instrument Co., Solana Beach, Calif., a corporation of California Application May 12, 1955, Serial No. 507,767

9 Claims. (Cl. 308—10)

This invention relates to method and means for suspending a rotatable object in space against gravity, whereby the object in its rotation about its own axis is axially spaced between and free from any mechanical connection to the suspension means and is free from forces of friction and torque.

An example of the use of my invention is in a pendulous device which is capable of establishing a vertical gravity reference plane. A simple pendulum will establish a true vertical if it remains at rest. If its length is such that its period is approximately 84.4 minutes, that is, if its length equals the radius of the earth, and its support is frictionless, it will maintain a true vertical regardless of motion or acceleration of the support. A simple pendulum of such length is impractical. A compound pendulum of practicable size can be made to have a period of 84.4 minutes and will have all the properties of a simple pendulum, provided its support is completely free from friction. For the purposes of illustration, it will be assumed that all forces which might be applied to the pendulous member by relative motion between it and the air or between it and stray magnetic fields and the like been eliminated.

A compound pendulum supported by an axle or spindle turning in frictionless bearings will have all of the ideal properties described above, except that it is free to swing only about its axis of rotation and will, when at rest, define only a vertical plane. Therefore, two such devices with the axes of rotation not parallel, would define a true vertical at the intersection of their respective vertical planes.

A bearing having substantially zero friction and torque has many other applications, such as chemical balance, electric meter, and the like, being applicable to many devices or instruments, in which bearing friction imposes a limit on the sensitivity or degree of perfection attainable.

It is well known that both chemical balances and electric meters have parts that rotate in bearings and that efforts are made to reduce friction in those bearings. My magnetic suspension being virtually free of friction, could be of utility in these or other devices in which friction imposes a limit upon the sensitivity or perfection of the device.

Accordingly, one of the primary objects is to provide a means of suspension of a rotatable object in space against gravity whereby the object in its rotation about its axis is spaced substantially coaxially between the suspension means and is free from forces of friction and torque.

A further object is to provide a magnetic suspension means employing a pair of coaxially disposed magnets which are capable solely by magnetic forces of attraction that are automatically varied, of suspending and positioning a ferromagnetic object in space against all external forces including gravity, so that it is free from any mechanical contact or connection with the suspension means and free to rotate about its own axis with zero friction and torque.

A further object is to provide means for so adjusting the magnetic forces that, in the absence of external longitudinal or acceleration forces applied to the ferromagnetic member being suspended, the axial resultant magnetic forces applied to the suspended member will be zero when the member is disposed midway of the coaxial magnets.

A further object is to provide a symmetry of magnets and suspended member such that the magnetic field in the air gaps contains no angular inhomogeneities.

A further object is to provide a sensing device which will detect axial movement of the suspended member in either direction between the poles of the coaxial electromagnets.

A further object is to provide a detector and amplifier adapted to be controlled by the sensing device and capable of so varying the magnetic strength of the coaxial electromagnets as to maintain the suspended ferromagnetic member at a mid point or neutral position between the poles of the coaxial electromagnets in opposition to external forces including axial forces.

Figure 2:
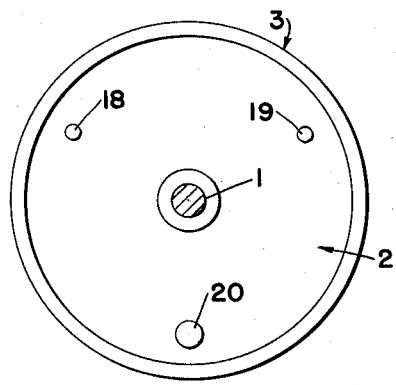

With the foregoing and other objects in view, the invention resides in the combination of parts and in details of construction hereinafter set forth in the following specification and appended claims, certain embodiments thereof being illustrated in the accompanying drawings, in which:

Figure 1 is a schematic illustration of my magnetic suspension as applied to a weighted compound long period pendulum wheel rigid with and shown to be rotatable about a horizontal axle suspended in space between the poles of two coaxial electromagnets and electrical circuitry including a sensing device, detector, amplifier and rheostats and a power source; and Figure 2 is a diagrammatical end view of the wheel showing an arrangement of balancing weights.

Referring more particularly to the drawings, Figure 1 shows a compound pendulum consisting of a ferromagnetic spindle 1, and a wheel 2 having a rim 3, the wheel and rim not being made of ferromagnetic material. The assemby of spindle 1, wheel 2, and rim 3 is so made that its center of mass lies in the plane of the wheel and at such a distance from the axis of symmetry of the assembly that, if free to rotate about that axis of symmetry under the force of gravity, the whole will swing as a compound pendulum and can be made by suitable means of balancing to have a period not limited by the means of support. Such a means of balancing is shown in Figure 2 wherein the wheel 2 has deposited thereon metal masses 18, 19 and 20, the latter of which is the heaviest to normally hold the wheel as shown. It is essential that the assembly of spindle 1, wheel 2, and rim 3 be substantially prefectly balanced about a point on the axis of spindle 1, and at the midpoint of its length. The assembly of spindle 1, wheel 2, and rim 3, is supported against the force of gravity, and any other transverse forces, by two coaxial electromagnets 4 and 5. In order to free the compound pendulum from effects due to air currents, or the friction due to the presence of air, it is surrounded by air tight enclosure 6, as shown in Figure 1, and which is evacuated to a low pressure.

The electromagnet 4 is excited by currents in windings 7 and 8, and the electromagnet 5 is excited by currents in windings 9 and 10. Windings 7 and 9 carry a current from a battery 11, or other source of continuous current. A variable rheostat 12 provides means for regulating the current through windings 7 and 9, which current is so adjusted that the magnetic forces on spindle 1, when midway between the poles of electromagnets 4 and 5 are sufficient to overcome a major portion of any force, due to gravity or any transverse acceleration acting on a spindle 1 in the direction at right angles to its length. The remainder of the force required to oppose any transverse force on spindle 1 is provided by currents flowing in windings 8 and 10, which currents are provided by the amplifier 13 in a manner to be described. By means of rheostats 16 and 17, the magnetic strength of each of the electromagnets 4 and 5 is so adjusted that attractive magnetic forces acting axially on the spindle 1 will be equal and opposite in direction when the spindle 1 is in the mid-position between the pole faces of the two magnets 4 and 5. The midpoint position of the spindle 1 is actually a neutral position magnetically.

Within the vacuum enclosure 6 and adjacent to wheel 2 there is fixed a sensing element 14. This sensing element 14 may be fixed in any suitable location with respect to the wheel 2 or the spindle 1 and may be any one of several types of position sensing elements known to those skilled in the art, the essential requirement being that sensing element 14, in conjunction with detector 15, give an electrical signal which is some simple function of departures of wheel 2 and spindle 1 from the midway position between electromagnets 4 and 5. In Figure 1 the sensing element 14 could be, for example, a coil, coaxial with the spindle 1, whose inductance varies with its proximity to the wheel 2. Similarly, sensing element 14 could be a capacitor whose capacitance varies with its proximity to the wheel 2, or sensing element 14 could consist of a beam of light and a photocell so arranged that axial movement of wheel 2 or spindle 1 would cause the amount of light falling on the photocell to vary. The sensing element 14 in conjunction with the detector 15 provides an electrical signal, which is some simple function of departures of wheel 2 and spindle 1 from the midway position between electromagnets 4 and 5, which vary as the assembly of spindle 1, wheel 2, and rim 3 depart from the mid-way position between electromagnets 4 and 5. The signals from detector 15 control the amplifier 13 in such a manner that if the assembly of spindle 1, wheel 2, and rim 3 moves slightly axially, for example, to the left, the current through winding 8 will be decreased, and the current through winding 10 increased and vice versa, thus exerting a force to restore that assembly to its original position.

The force of gravity, or any other transverse force, will tend to cause a displacement of the spindle 1 from its position coaxial with the electromagnets 4 and 5. However, with perfect transverse balance of the assembly consisting of the spindle 1, wheel 2, and rim 3 established, any transverse displacement of this assembly from coaxial alignment with the electromagnets 4 and 5 will be of such a nature that the axis of the spindle 1 will remain at all times parallel to the axis of the electromagnets 4 and 5. By a suitable choice of the field strengths of the electromagnets 4 and 5, it is possible to make the parallel displacement of the spindle 1 from the coaxial position negligible.

It will be seen that the device thus far described is capable of supporting the spindle 1 and the attached wheel 2 and rim 3 in space mid-way between the poles of electromagnets 4 and 5. By a proper choice of the characteristics of the detector 15, any displacement of the spindle 1 axially from its equilibrium position will be rapidly damped out, and the assembly of spindle 1, wheel 2, and rim 3 will be suspended in space completely free from physical contact of any kind and thus substantially free from friction and torque.

It might be assumed that due to rotation of the spindle 1 relative to the electromagnets 4 and 5, there would be considerable electromagnetic coupling between the two due to eddy currents or other magnetic effects. This coupling can be made zero to the first order if the construction of the spindle 1 and the electromagnets 4 and 5 is such that the distribution of magnetic flux in each air gap between the pole faces of said spindle and the electromagnets can be expressed mathematically as a function only of the radial distance from the axis or center line of the air gap. This is accomplished by making the spindle 1 and the electromagnets 4 and 5 of magnetically homogeneous material and of such a form that they possess circular symmetry about their respective axes and have pole faces of substantially the same cross sectional area. Higher order coupling effects which might be due to the parallel displacement of the axis of the spindle 1 with respect to the common axis of the electromagnets 4 and 5 are in fact negligible so that my invention accomplishes the provision of a substantially frictionless bearing.

While I have shown the windings 7 and 9 to be in parallel with the rheostats 16 and 17 it is to be understood that my invention also contemplates the possibility of having the rheostats in series with their respective windings, which latter arrangement is preferable with respect to economy in the use of electric power.

When I use the term "circular axial symmetry" hereinafter in the claims, I mean to imply that the distribution of physical and magnetic properties along any radial line extending from the axis of the suspended object is the same as along any other radial line. When I refer to "physical properties" I am referring to such quantities as composition, density, hardness, grain size and residual stress. When I refer to "magnetic properties" I am referring to such quantities as permeability, coercive force, retentivity, hysteresis and loss per cycle.

From the foregoing, it will be seen that I have provided a device that accomplishes the magnetic suspension of a ferromagnetic member in space so as to be free to rotate about its axis with substantially zero torque and friction. I have provided a system of coaxial magnets capable of supporting the ferromagnetic member and means for so adjusting the magnetic forces that, in the absence of an external axial force or acceleration applied to the ferromagnetic member, the longitudinal resultant of all magnetic forces applied to said ferromagnetic member is zero when the suspended member is at the midpoint between the coaxial magnets. I have provided axial symmetry, both physical and magnetic, in the magnets and the suspended ferromagnetic member. I have provided a sensing device which detects axial motion of the magnetically suspended member in either direction from the midpoint between the poles of the coaxial magnets and a detector and amplifier controlled by said sensing device capable of so altering the magnetic strength of the coaxial electrical magnets as to maintain the suspended ferromagnetic member at the midpoint between the poles of the coaxial electromagnets in opposition to and despite any reasonable axial forces applied to it due to any cause. This is true whether the suspension is in a horizontal plane or any plane at any angle therewith.

It is to be understood that I am primarily concerned with magnetic suspension of objects in space between coaxially disposed suspension magnets, as distinguished from being in overlapping relationship, so that the axis of suspension of the suspended object is maintained substantially coaxial with the suspension magnets.

Moreover, by means of my suspension system, I am able to so suspend the object in space, despite the existence of varying external forces that may be applied to the object, such as the shifting of the axis of suspension relative to the horizontal. In other words, my suspension is operable not only under static conditions, but is designed for use in a system that will be operable under dynamic conditions such as occur when used on a moving platform or in moving vehicles, such as aircraft and the like.

I claim:

1. A magnetic suspension device, comprising a pair of coaxially spaced electromagnets, a magnetic material object suspended freely in space in coaxial alignment with and between said electromagnets, said electromagnets constituting the sole supporting means for said object, said object being free to rotate about its own axis in the suspended position, electrical means connected to said electromagnets for so adjusting the field strength of said electromagnets that, in the absence of external forces applied axially to said object, the axial resultant of the forces applied by both said electromagnets to said object is zero when said object is substantially centered between said electromagnets, means to detect axial movement of said object from its centered position due to an applied force, and means connected with said electromagnets and controlled by said detecting means to alter the field strength of each electromagnet so as to exactly counter the applied force and return said object to its centered position.

2. A magnetic suspension device for an object including magnetic material comprising a pair of coaxially spaced electromagnets, said object being freely suspended in space in coaxial alignment with and between said electromagnets, said electromagnets constituting the sole supporting means for said object, electrical means connected to said electromagnets for so adjusting the field strength of said magnets that, in the absence of external forces applied to said object, the axial resultant of the forces applied by both said electromagnets to said object is zero when the object is substantially centered between said electromagnets, and control means responsive to an axial movement of said object from its centered position as caused by an applied force to vary the field strength of one electromagnet oppositely to the other to substantially immediately return the object to its centered position.

3. In a magnetic suspension device, a pair of coaxially spaced electromagnets and a magnetic material object, means including said electromagnets for suspending said object in space coaxially between said electromagnets but mechanically unattached to said device so that said object is freely rotatable about its own axis, said electromagnets constituting the sole supporting means for said object, electrical means connected to said electromagnets for so adjusting the magnetic forces in said electromagnets that, in the absence of external forces or movement axially of said object between said electromagnets, the axial resultant of all magnetic forces applied to said object is zero when said object is in a neutral position between said coaxial electromagnets.

4. In a magnetic suspension device, a pair of coaxially spaced electromagnets and a magnetic material object, means including said electromagnets for suspending said object in space coaxially between said electromagnets but mechanically unattached to said device so that said object is freely rotatable about its own axis, said electromagnets constituting the sole supporting means for said object, electrical means connected to said electromagnets for so adjusting the magnetic forces in said electromagnets that, in the absence of external forces or movement axially of said object between said electromagnets, the axial resultant of all magnetic forces applied to said object is zero when said object is in a neutral position between said coaxial electromagnets, said electromagnets and said object having physical and magnetic properties in circular axial symmetry.

5. In a magnetic suspension device, a pair of horizontally and coaxially spaced electromagnets and a wheel having a weighted portion and a magnetic material axle, means including said electromagnets for suspending said axle and its wheel in space coaxially between said electromagnets but mechanically unattached to said device so as to be freely rotatable about the axis of said axle, electrical means connected to said electromagnets for so adjusting the magnetic forces in said electromagnets that, in the absence of external forces or movement axially of said axle between said electromagnets, the axial resultant of all magnetic forces applied to said axle is zero at the axial midway point between said coaxial electromagnets.

6. In a magnetic suspension device, a pair of horizontally and coaxially spaced electromagnets and a wheel having a weighted portion and a magnetic material axle, means including said electromagnets for suspending said axle and its wheel in space coaxially between said electromagnets but mechanically unattached to said devise so as to be freely rotatable about the axis of said axle, electrical means connected to said electromagnet for so adjusting the magnetic forces in said electromagnets that, in the absence of external forces or movement axially of said axle between said electromagnets the axial resultant of all magnetic forces applied to said axle is zero at the axial midway point between said coaxial electromagnets, said electromagnets and said wheel and axle having physical and magnetic properties in circular axial symmetry.

7. In a magnetic suspension device, a pair of horizontally and coaxially spaced electromagnets and a wheel having a weighted portion and a magnetic material axle, means including said electromagnets for suspending said axle and its wheel in space coaxially between said electromagnets but mechanically unattached to said device so as to be freely rotatable about the axis of said axle, electrical means connected to said magnets for so adjusting the magnetic forces on said magnets that, in the absence of external forces or movement axially of said axle between said electromagnets, the axial resultant of all magnetic forces applied to said axle is zero at the axial midway point between said coaxial electromagnets, said electromagnets and said wheel and axle having physical and magnetic properties in circular axial symmetry, a sensing device for detecting axial movement of said wheel and axle in either direction from the midpoint between said coaxial electromagnets and an evacuated envelope for housing said wheel, axle and sensing device, and a detector and amplifier controlled by said sensing device capable of so altering the magnetic strength of said electromagnets to provide a force in opposition to external forces applied to said wheel and axle to maintain said wheel and axle at the midpoint between said electromagnets.

8. In a magnetic suspension device, a pair of horizontally and coaxially spaced electromagnets and a magnetic material object, said object being suspended in space coaxially between said electromagnets but mechanically unattached to said electromagnets so that said object is freely rotatable about its own horizontal axis, electrical means connected to said electromagnets for so adjusting the magnetic forces in said electromagnets that, in the absence of external forces or movement axially of said object between said electromagnets, the axial resultant of all magnetic forces applied to said object is zero when said object is at the axial midway point between said coaxial electromagnets, said electromagnets and said object having physical and magnetic properties in circular axial symmetry, a sensing device for detecting axial movement of said object in either direction from the midpoint between said coaxial electromagnets, and a detector and amplifier controlled by said sensing device capable of so altering the magnetic strength of said electromagnets to provide a force in opposition to external axial forces applied to said object to maintain the suspended object at the midpoint between said electromagnets.

9. In a magnetic suspension device, a pair of coaxially spaced electromagnets and a magnetic material object, means including said electromagnets for suspending said object in space coaxially between said electromagnets but mechanically unattached to said device so that said object is freely rotatable about its own axis, said electromagnets constituting the sole supporting means for said object, electrical means connected to said electromagnets for so adjusting the magnetic forces in said electromagnets that, in the absence of external forces or movement axially of said object between said electromagnets, the axial resultant of all magnetic forces applied to said object is zero when said object is in a neutral position between said coaxial electromagnets, said electromagnets and said object having physical and magnetic properties in circular axial symmetry, a sensing device for detecting axial movement of said object in either direction from the neutral position between said coaxial electromagnets, and a detector and amplifier controlled by said sensing device capable of so automatically altering the magnetic strength of said electromagnets to provide a force in opposition to external axial forces applied to said object to maintain the suspended object at the neutral position between said electromagnets.

References Cited in the file of this patent

UNITED STATES PATENTS

| | | |
|---|---|---|
| 624,142 | White | May 2, 1899 |
| 1,589,039 | Anschutz-Kaempfe | June 15, 1926 |
| 2,566,221 | Lovell | Aug. 28, 1951 |
| 2,691,306 | Beams et al. | Oct. 12, 1954 |
| 2,695,165 | Hansen | Nov. 23, 1954 |
| 2,704,231 | Goldsmith | Mar. 15, 1955 |
| 2,725,266 | Mendelsohn | Nov. 29, 1955 |
| 2,733,857 | Beams | Feb. 7, 1956 |